Figure 1:
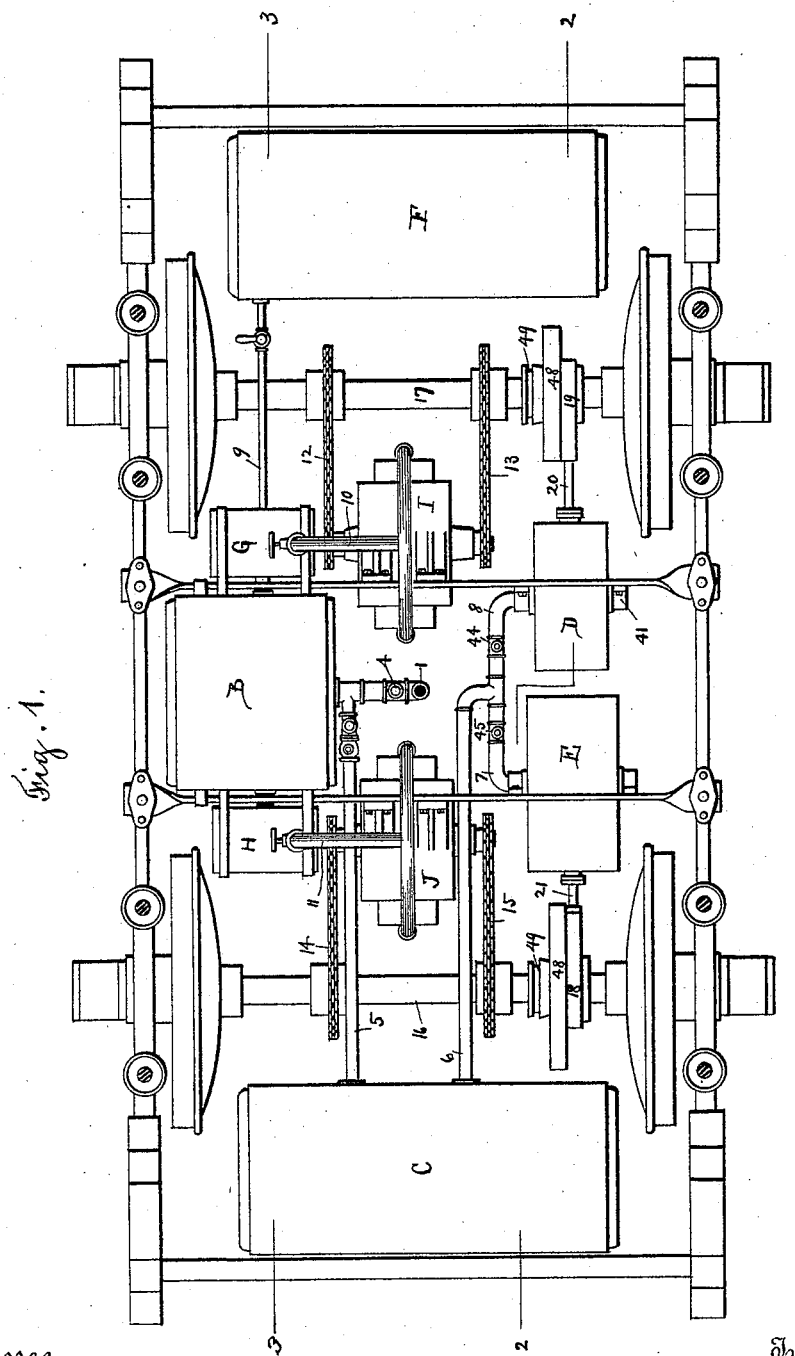

(No Model.)

4 Sheets—Sheet 1.

M. E. CLARK.
MOTOR SYSTEM.

No. 575,681.

Patented Jan. 19, 1897.

Witnesses
L. C. Muzzy
Rm Washburn.

Inventor
Merrill E. Clark
By Attorney
C. J. Washburn

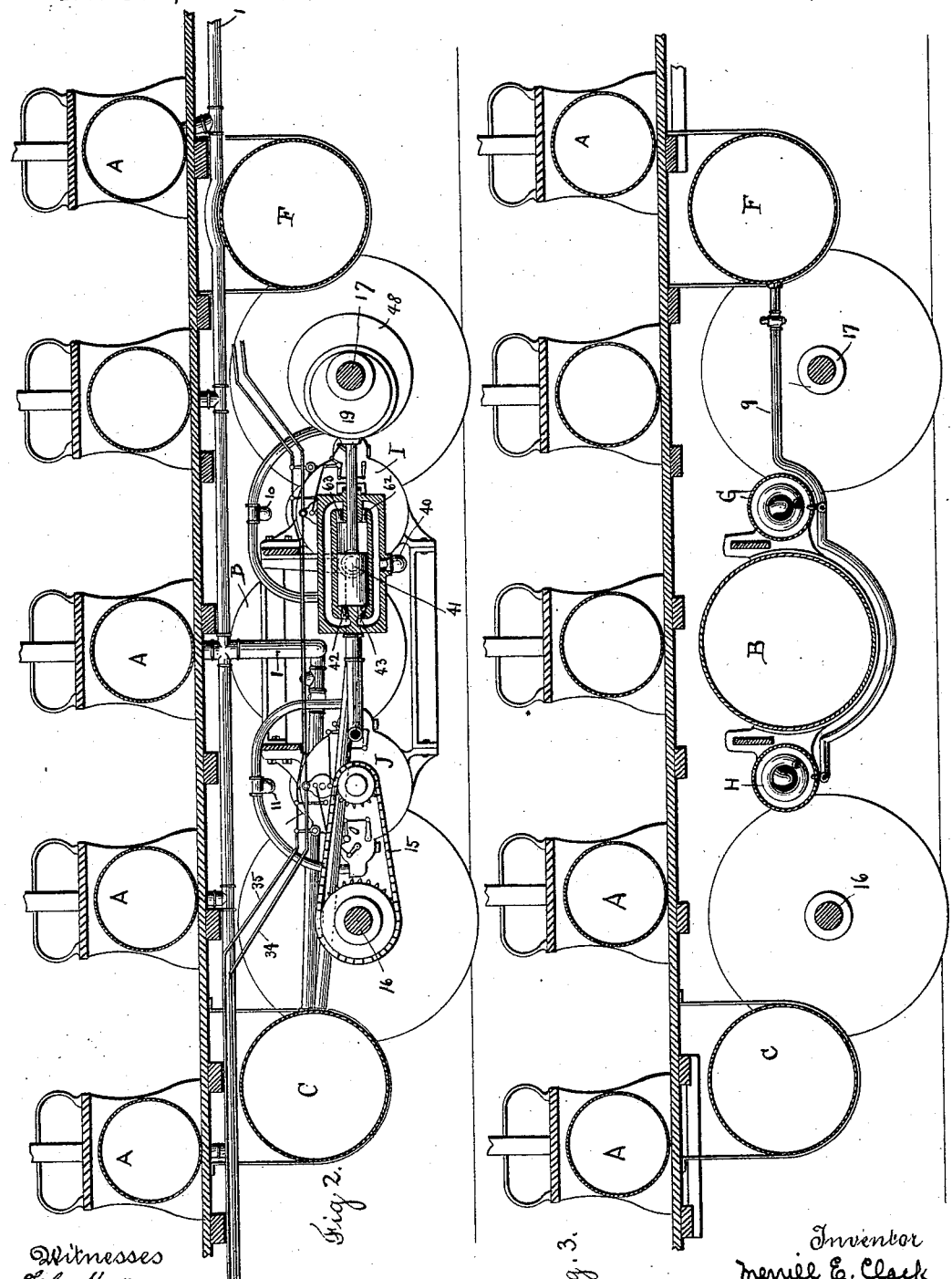

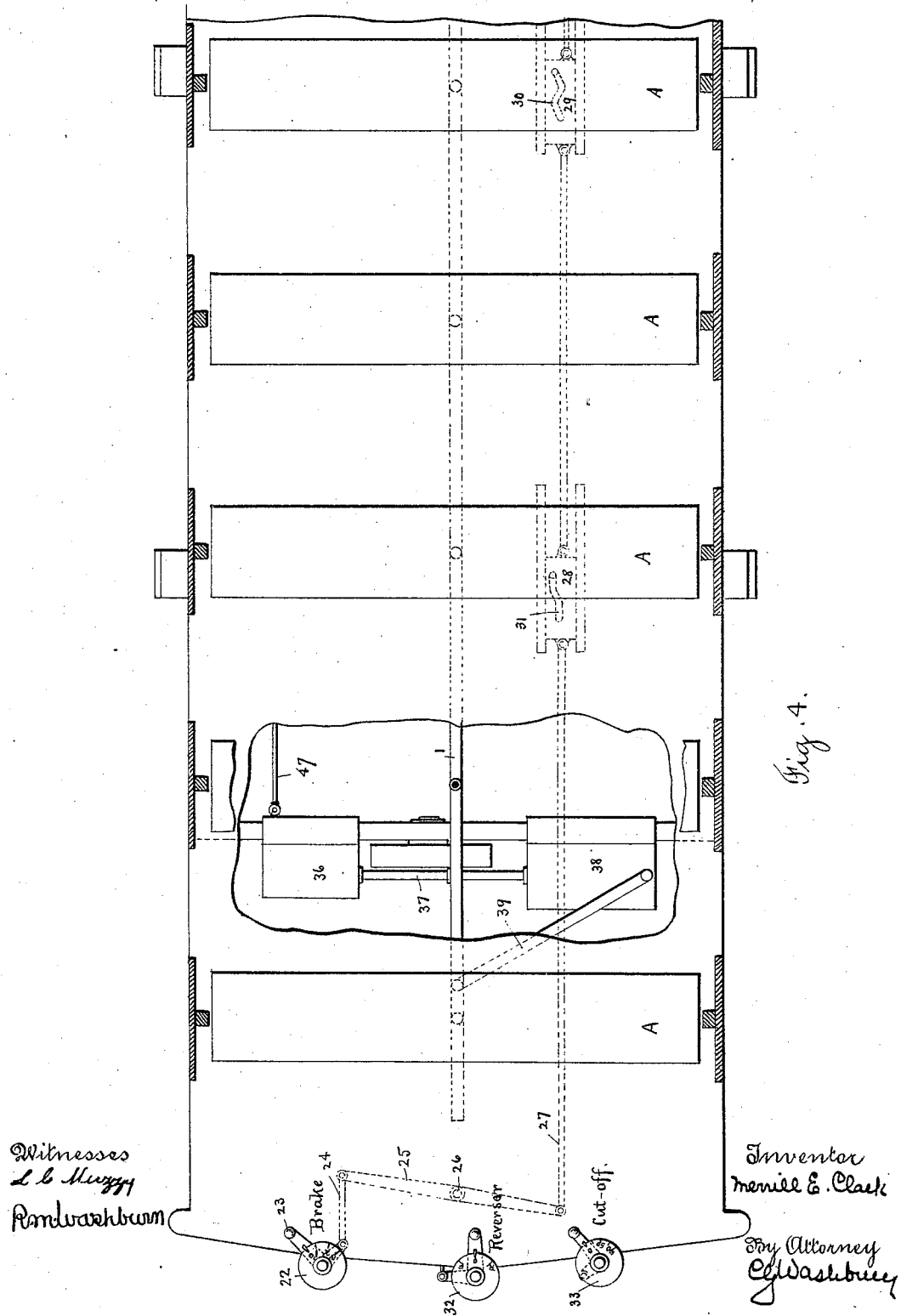

(No Model.)  M. E. CLARK.  4 Sheets—Sheet 4.
MOTOR SYSTEM.
No. 575,681. Patented Jan. 19, 1897.
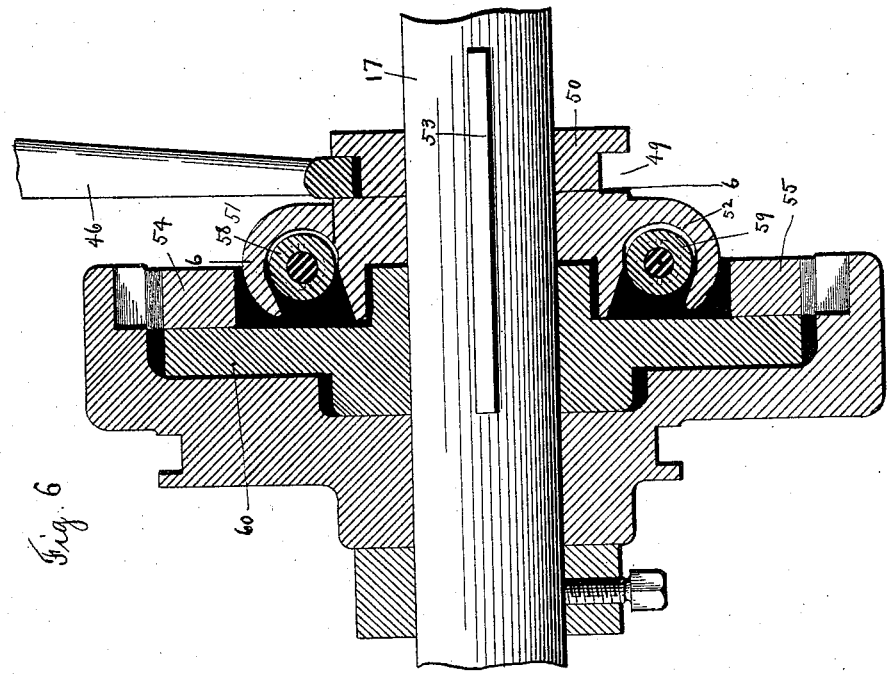
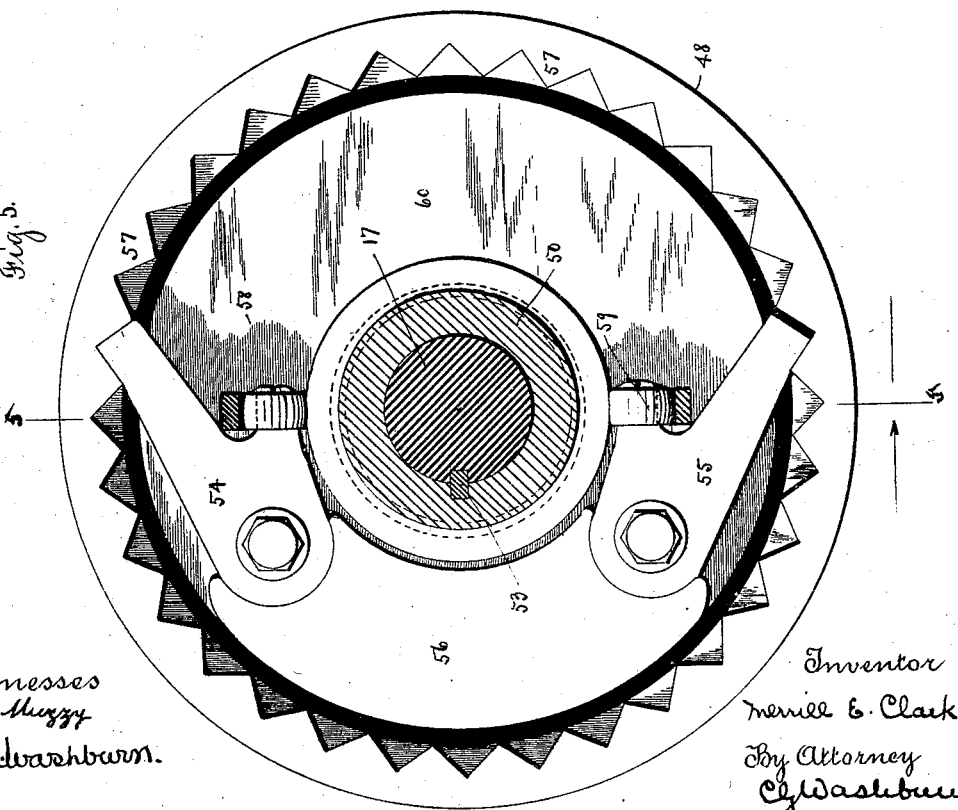
Witnesses
L. C. Muzzy
R. M. Washburn.
Inventor
Merrill E. Clark
By Attorney
C. J. Washburn
THE NORRIS PETERS CO., PHOTO-LITHO., WASHINGTON, D. C.

UNITED STATES PATENT OFFICE.

MERRILL E. CLARK, OF WORCESTER, MASSACHUSETTS, ASSIGNOR OF ONE-HALF TO WILLIAM T. SEARLS, OF SAME PLACE.

MOTOR SYSTEM.

SPECIFICATION forming part of Letters Patent No. 575,681, dated January 19, 1897.

Application filed October 24, 1895. Serial No. 566,683. (No model.)

*To all whom it may concern:*

Be it known that I, MERRILL E. CLARK, a citizen of the United States, residing in the city and county of Worcester, and Commonwealth of Massachusetts, have invented certain new and useful Improvements in a Motor System for Cars and other Vehicles, of which the following is a specification.

The object of my invention, primarily, is to provide a motor system in which the energy expended in stopping a vehicle may be stored and subsequently utilized in starting and propelling it.

The manner in which this system may be applied to street-cars is illustrated in the accompanying drawings, in which—

Figure 1 is a plan view of an ordinary truck and of the operative motor parts of the car. Fig. 2 is a side elevation through the line 2 2, Fig. 1. Fig. 3 is a side elevation through the line 3 3, Fig. 1. Fig. 4 illustrates in plan the brake mechanism, and also shows the location of levers for actuating the reversing and cut-off mechanism, and also shows another form in which my system may be applied, an air compressor and receiver being attached to the framework of the truck. Fig. 5 is an end view of the grip mechanism, by means of which the brake is applied and disengaged, through the line 5 5, Fig. 6. Fig. 6 is a sectional view through the line 6 6, Fig. 5.

I describe and illustrate two forms in which my system may be applied. The first, and that which is illustrated in detail, consists in providing the car with any necessary number of storage-chambers, which may be charged with compressed air from stations located at convenient intervals along the line of the road. The car is provided with a pair of engines, of the rotary type, preferably, which are driven by compressed air. Air-compressors are operatively connected with the axles of the truck in such a manner that when the car is stopped the energy ordinarily lost in the application of a brake is used to operate the air-compressors, and the air thus compressed is stored for subsequent use in starting and propelling the car.

In the form of apparatus illustrated in Fig. 4, I may dispense with the sources of supply of compressed air outside the car and may attach to the car an air-compressor, operatively connected with a gas-engine, and may thus secure a supply of compressed air independent of any outside source.

Having in general terms defined the nature and scope of my invention, I will describe the particular apparatus shown, and its mode of operation in detail.

In the drawings, L is a pipe running under the frame of the car, through which a supply of compressed air may be received from some outside source and preferably at a pressure of, say, six hundred pounds to the square inch, which, by a suitably-located reducing-valve, (not shown in the drawings,) may be reduced to a pressure of, say, four hundred pounds.

A indicates a series of receivers, which may be located conveniently under the seats of the car.

B is a "working receiver," so called, located below the frame of the car, between which and the supply-pipe L is a second reducing-valve 4, which reduces the pressure from four hundred pounds to the square inch to about one hundred pounds to the square inch, which I believe to be desirable pressure under which to operate my system.

C is also a receiver connected with the working receiver B by the pipe 5, and also connected by the pipe 6 and branch pipes 7 and 8 with the air-compressors D and E, of which E is about twice the capacity of D, for a reason to be hereinafter explained.

F is a chamber for the storage of gas, which is conveyed by the pipe 9 into the heating-chambers G and H, which are located on either side of the receiver B for the purpose of heating the air, as indicated in Fig. 3. From the heating-chambers G H the superheated air is conveyed by the pipes 10 and 11 to two engines, preferably of the rotary type, I J, which are connected, by means of sprocket-chains 12 13 14 15, with sprocket-wheels upon the axles 16 17 of the truck. The exhaust from the engines is carried into the jacket surrounding an air-compressor through the pipe 40, Fig. 2, and thence escapes into the outer air through the port 41, Figs. 1 and 2, the double advantage being secured of keeping the air-compressor at an even temperature, avoiding excessive heat or cold, and at the same time muffling any disagreeable noise attendant upon running the apparatus, which would result if the exhaust were direct into the outer air.

It will be noted that as the outer air has free access to the jacket of the compressor it will be drawn into the cylinder of the compressor through the inlet-valve 43, and the air compressed when the piston travels from right to left will be forced through the outlet-valve 42 and into the receiver. The inlet and outlet valves 62 63 at the opposite end of the cylinder work in the same manner, air being compressed on both sides of the piston at each revolution.

Attached to the axles 16 17 are the eccentrics 18 19, both of which are shown in plan in Fig. 1 and one of which is shown in side elevation in Fig. 2. The eccentrics are connected by the rods 20 21 with pistons which have a reciprocating motion in the compressor-cylinders D E, and the air thus compressed in the manner described is conveyed through the branch pipes 7 8 to the main pipe 6 and into the receiver C, where it is stored and may be utilized in starting and propelling the car.

44 45 are check-valves designed to maintain a uniform pressure in pipe 6.

The eccentrics are operated when the car is being stopped, and with the connecting mechanism are designed to act as brakes, which are applied in the following manner:

In Fig. 4, 22 represents a dial, and 23 a crank of ordinary form pivotally attached to the center of the dial and capable of taking the positions 1' 2' 3' indicated upon the dial. The crank 23 terminates in an angle-piece pivotally attached to the rod 24, which is connected in the same way with the rod 25, pivoted at 26, the rod 25 being connected with the rod 27, which is attached to the plates 28 29, which have a reciprocating motion within the ways indicated and which have cut in their faces the cam-paths 30 31, differing somewhat in shape for a purpose to be explained. These plates lie in a horizontal plane above the eccentrics 18 19. From the latter upwardly project two arms, one of which, 46, is shown in Fig. 6, the ends of which are adapted to travel in the cam-paths 30 31, and the parts are so connected and timed that when the brake-crank 23 is moved into position 1' indicated upon the dial the clutch connecting with eccentric 19 is operated, the compressor D is strrted, and the motion of the car is checked. If it is desired to apply a stronger retarding force, the brake 23 is moved into position 2' indicated upon the dial. This, by reason of the differently-shaped cam-paths 30 31, disengages the clutch which actuates eccentric 18. The compressor E is thus put in operation, and by reason of its larger area a stronger retarding effect is exerted upon the progress of the car.

By moving the brake-lever 23 into position 3' upon the dial the compressor E remains in operation and compressor D is again started, and the combined resistance of both compressors may thus be used in stopping the car, the air thus compressed, as above explained, being stored in receiver C for use in starting and propelling the car.

Should it be found desirable or necessary to apply a still greater force in stopping the car, the air-pressure in the chambers may be increased by a manipulation of the reducing-valves, and the amount of power which may thus be applied is only limited by the amount of pressure under which the air in the receiving-chamber may be held.

The details of the clutch mechanism (shown in Figs. 5 and 6) may be explained here. The eccentric 19 is rigidly attached to the disk 48 and both move freely on the axle 17. The lower end of arm 46, which is pivoted near the center at a point not shown in the drawings, runs in the slot 49 in the disk 50. The upper end is adapted to travel in the cam-path 30. The disk 50 is provided with two forks 51 52 and slides freely upon the key 53 in the axle.

54 and 55 are dogs attached to the disk 60 and supported by the projection 56, which is cast with the disk 60, which is rigidly attached to the axis 17 and revolves with it. The longer arm of the dog is adapted to engage with the teeth 57 in disk 48 when in position to do so. The shorter arm of the dog is provided at its extremity with rolls 58 59. When the disk 50 is in its inward position, the wedge-shaped arm of the fork nearest the axle forces the dog into contact with the teeth of disk 48, forming a rigid connection, and hence revolving the disk and the eccentric to which it is attached. When the disk 50 is in the outward position, the hook-shaped arm of the fork farthest removed from the axle forces the dog out of contact with the teeth of disk 48, and the latter, and with it the eccentric 19, ceases to revolve. The operation of the clutch mechanism on the axle 16 is the same.

In Fig. 4 will also be noticed the dials 32 33 for the reversing and cut-off mechanism, the connections with the engines being shown in Fig. 2, in which the rod 34 controls the valve mechanism through which the engine is started and reversed, and 35 the rod operating the cut-off mechanism, which is thus directly under the control of the person operating the car.

In the modification illustrated in Fig. 4 I convey gas through the pipe 47 from the gas-chamber F into cylinder 36, where it is exploded in any well-known manner behind a piston connected by rod 37 with a piston within the compressor 38, the compressed air being conveyed through the pipe 39 to one or more receivers, from which it may be taken to the engine.

Any suitable form of engine may be used successfully in my system, but I prefer to use the type of engine illustrated in the drawings, as it is efficient and economical.

Aside from the receivers designated A, which are placed under the seats of the car, it will be noticed that the remaining receivers B, C, and F, together with the engines and connecting and operating parts, are hung upon a frame which is supported by springs and not suspended directly from the axles of the car, the result being that the car rides much more easily than if this arrangement were not made. This may make it necessary or desirable to use flexible instead of rigid connecting parts, but this is a matter of detail which can be arranged to meet the requirements of the individual case.

Having described the construction of my apparatus, I will briefly outline its mode of operation. The car being at rest, and the receivers having been charged with compressed air from some outside source, the operator by proper manipulation of the starting and cut-off levers applies power to the engines, which act upon the axles of the truck and propel the car at a rate of speed within the control of the operator. If it is desired to stop the car, the brake-crank is turned, the clutches are connected with the eccentrics, and the compressors, one or both, are started, as above described, thus acting as a brake. The air thus compressed is conveyed to the receiver, and thus a large proportion of the energy expended in stopping the car is stored and may be utilized in starting and propelling the car; and this operation is repeated in the progress and stopping of the car between the terminals of the road.

In the application of the system in the manner shown in Fig. 4 the compressor may be run continuously until the supply of gas is exhausted, the compressed air thus produced being used in the way already explained. I regard this as a most useful form in which the system may be applied, as I am thus able to dispense with some of the receivers otherwise necessary.

I do not confine myself to any particular number of air-receivers, nor to any form of air-compressor or engine, nor to the method described for heating the air, nor to any particular arrangement of the mechanism shown, as other forms of apparatus, differently arranged, for performing these several offices may be used successfully.

Having described my invention, what I claim as new, and desire to secure by Letters Patent, is—

1. In a motor system, the combination of a receiver for storing compressed air, an engine attached to the vehicle, adapted to be actuated by the air in said receiver and operatively connected with the axles of the vehicle, a plurality of air-compressors adapted to be operated by the axles, and suitable connecting and operating mechanism whereby any or all of said compressors may be worked when the brake is applied, and at other times may be at rest, substantially as described.

2. In a motor system, the combination of a receiver for storing compressed air, an engine attached to the vehicle adapted to be actuated by the air in said receiver and operatively connected with the axles of the vehicle, a plurality of air-compressors adapted to be operated by the axles, suitable connecting and operating mechanism whereby any or all of said compressors may be worked when the brake is applied, and at other times may be at rest, a receptacle for storing gas, a chamber heated by said gas through which air may be conveyed to said engine, substantially as described.

3. In a motor system, the combination of a receiver for storing compressed air, an engine attached to the vehicle adapted to be actuated by the air in said receiver and operatively connected with the axles of the vehicle, an air-compressor adapted to be operated by the axles, means for carrying the exhaust from the engines into the jacket of the air-compressor, and suitable connecting and operating mechanism whereby the compressor may be worked when the brake is applied, and at other times may be at rest, substantially as described.

4. In a motor system, the combination of a gas-supply, an air-compressor actuated by the explosion of said gas in a cylinder, suitably constructed and located, a receiver for storing said compressed air, an engine attached to the vehicle adapted to be actuated by the air in said receiver and operatively connected with the axles of the vehicle, a second air-compressor adapted to be operated by said axles, and suitable connecting and operating mechanism whereby the compressor may be worked when the brake is applied, and at other times may be at rest, substantially as described.

5. In a motor system, the combination of a gas-supply, an air-compressor actuated by the explosion of said gas, in a cylinder, suitably constructed and located, a receiver for storing said compressed air, an engine attached to the vehicle, adapted to be actuated by the air in said receiver, and operatively connected with the axles of the vehicle, a plurality of air-compressors adapted to be operated by the axles and suitable connecting and operating mechanism, whereby any or all of said compressors may be worked when the brake is applied, and at other times may be at rest, substantially as described.

MERRILL E. CLARK.

Witnesses:
C. G. WASHBURN,
R. M. WASHBURN.